United States Patent [19]

St. Clair

[11] Patent Number: 5,061,783

[45] Date of Patent: Oct. 29, 1991

[54] PROCESSING FOR MAXIMIZING THE LEVEL OF CRYSTALLINITY IN LINEAR AROMATIC POLYIMIDES

[75] Inventor: Terry L. St. Clair, Poquoson, Va.

[73] Assignee: The United States of America as represented by the Administrator of the National Aeronautics and Space Administration, Washington, D.C.

[21] Appl. No.: 516,489

[22] Filed: Apr. 30, 1990

Related U.S. Application Data

[63] Continuation-in-part of Ser. No. 35,430, Apr. 7, 1987, abandoned.

[51] Int. Cl.$^5$ .............................................. C08G 73/10
[52] U.S. Cl. ..................................... 528/125; 528/126; 528/128; 528/172; 528/173; 528/179; 528/182; 528/188; 528/220; 528/222; 528/224; 528/229; 528/351; 528/353; 525/436
[58] Field of Search ............... 528/125, 126, 128, 172, 528/173, 179, 182, 188, 220, 222, 224, 229, 351, 353; 525/436

[56] References Cited

U.S. PATENT DOCUMENTS

| | | | |
|---|---|---|---|
| 3,179,630 | 4/1965 | Endrey | 528/183 |
| 3,242,136 | 3/1966 | Endrey | 528/184 |
| 3,663,728 | 5/1972 | Hoback et al. | 528/222 |
| 4,687,836 | 8/1987 | Ibi et al. | 528/208 |

*Primary Examiner*—Harold D. Anderson
*Assistant Examiner*—Frederick Krass
*Attorney, Agent, or Firm*—George F. Helfrich

[57] ABSTRACT

The process of the present invention includes first treating a polyamide-acid (such as LARC-TPI polyamide-acid) in an amide-containing solvent (such as N-methylpyrrolidone) with an aprotic organic base (such as triethylamine), followed by dehydrating with an organic dehydrating agent (such as acetic anhydride). The level of crystallinity in the linear aromatic polyimide so produced is maximized without any degradation in the molecular weight thereof.

8 Claims, 10 Drawing Sheets 5,061,783

PROCESSING FOR MAXIMIZING THE LEVEL OF CRYSTALLINITY IN LINEAR AROMATIC POLYIMIDES

ORIGIN OF THE INVENTION

The invention described herein was made by an employee of the United States Government and may be manufactured and used by or for the Government for governmental purposes without the payment of any royalties thereon or therefor.

CROSS-REFERENCE

This application is a continuation-in-part of my co-pending application, Ser. No. 07/035,430, filed Apr. 7, 1987 now abandoned.

BACKGROUND OF THE INVENTION

1. Field of the Invention

This invention relates generally to linear aromatic polyimides. It relates particularly to maximizing the level of crystallinity in linear aromatic polyimides without degrading the molecular weight thereof.

2. Prior Art

Linear aromatic polyimides are well known to have exceptional thermal and oxidative stabilities. However, they are very difficult to process into useful forms, because of their poor softening/flow properties. Most of these polymers have to be processed at temperatures approaching 400° C. and at pressures of 500 to 10,000 psi. At these high temperatures and pressures a sintering of finely divided polymer particles occurs. In order for linear aromatic polyimides to be useful as adhesives, molding powders and matrix resins for various applications, the polymers should exhibit flow at lower temperatures and pressures.

Accordingly, a primary object of the present invention is to provide a process for converting the polyamide-acid precursors of polyimides to polyimides which exhibit maximum levels of crystallinity, so that these crystalline forms can then be melted at relatively moderate temperatures to afford adequate flow for molding and consolidation operations.

Another object of the present invention is to provide a method for maximizing and controlling the level of crystallinity that develops in polyimides as they are chemically cyclodehydrated from their corresponding polyamide-acid precursors.

A further object of the present invention is to provide a process for chemically converting polyamide-acids to the corresponding semi-crystalline polyimides without degrading the molecular weight of the polyimides.

SUMMARY OF THE INVENTION

By the present invention, linear aromatic polyimides are produced which exhibit a maximum of metastable crystallinity that results in a melt-flow behavior that makes these materials attractive as adhesives, molding powders and matrix resins for many potential applications.

According to the present invention, the foregoing and additional objects are attained by providing a process which involves first dissolving a polyamide-acid in an amide solvent, or a mixture of an ether and an amide solvent, at low percent solids, followed by treating this solution with an aprotic organic base, such as triethylamine or pyridine. The polyamide-acid employed is the reaction product of 3,3',4,4'-benzophenonetetracarboxylic dianhydride and an aromatic diamine, especially 3,3'-diaminobenzophenone prepared in diglyme, or 4,4'-oxydianiline prepared in dimethylacetamide, or 3,3'-diaminodiphenylsulfone prepared in diglyme. Finally, this solution is treated with an organic dehydrating agent.

It is important to observe that with regard to the dissolving of the polyamide-acid in the solvent, at least some amide solvent must be employed to afford maximum crystallinity.

Moreover, it is important to observe that with regard to the treatment of the polyamide-acid in dilute solution with an aprotic organic base, the solution must be stirred or allowed to be in the presence of the aprotic organic base prior to the addition of the dehydrating agent, or maximum crystallinity will not develop.

Finally, it is important to observe that with regard to the treatment of the dilute polyamide-acid/aprotic organic base solution with the dehydrating agent, the solubility of the resulting polyimide in the reaction mixture affects the resulting degree of crystallinity. Also, the time that the dehydrated polymer is in contact with the final solution affects the degree of crystallinity.

BRIEF DESCRIPTION OF THE DRAWINGS

For a more complete understanding of the present invention, including its objects and benefits, reference should be made to the Detailed Description of the Preferred Embodiments, which is set forth below. This Detailed Description should be read together with the accompanying drawings, wherein.

DETAILED DESCRIPTION OF THE PREFERRED EMBODIMENTS
The scheme for preparing linear aromatic polyimides is set forth in the following Equation (1):
There are many aromatic dianhydrides which may be employed in the preparation of linear aromatic polyimides. Some of the more commonly used aromatic dianhydrides are:
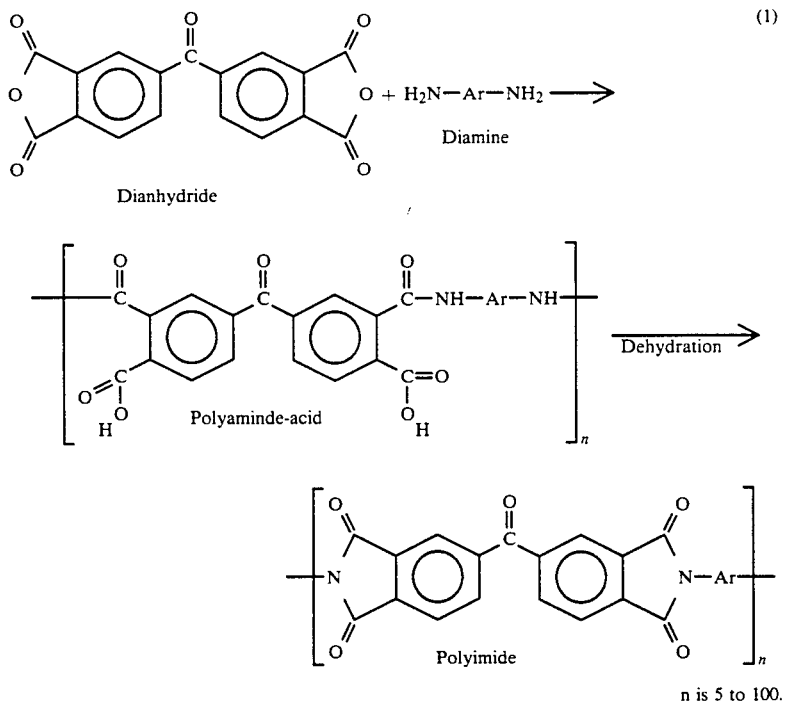
(1)
n is 5 to 100.
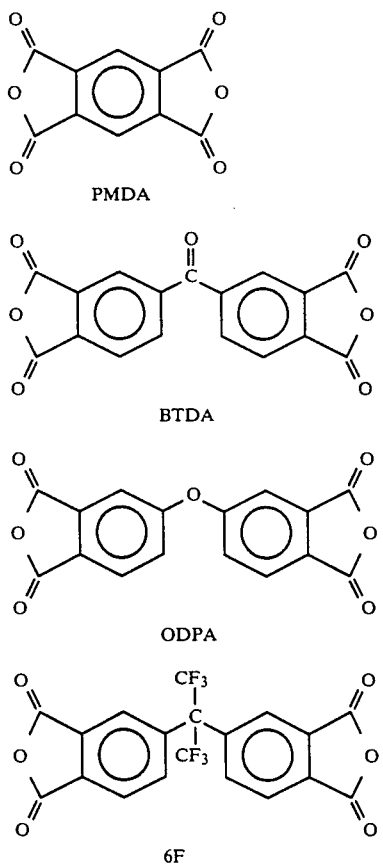
PMDA
BTDA
ODPA
6F

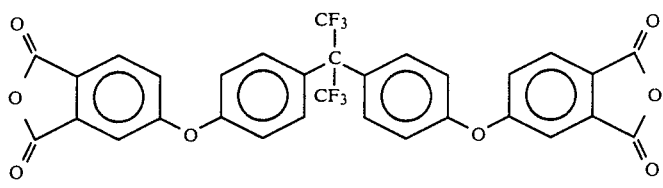

BFDA

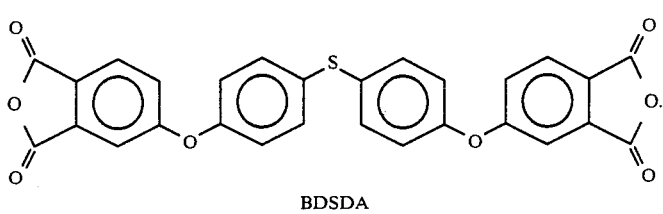

BDSDA

Likewise, there are a large number of aromatic diamines which may be employed in the preparation of linear aromatic polyimides. Some of the more commonly used aromatic diamines:

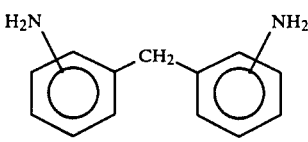

MDA

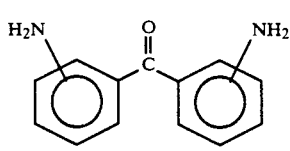

DABP

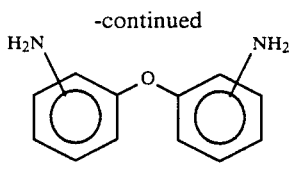

ODA

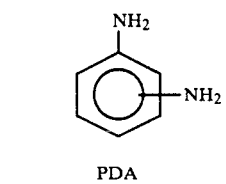

PDA

Two particular linear aromatic polyimides—designated "LARC-TPI" and "PISO2"—are especially useful in the practice of the process of the present invention:

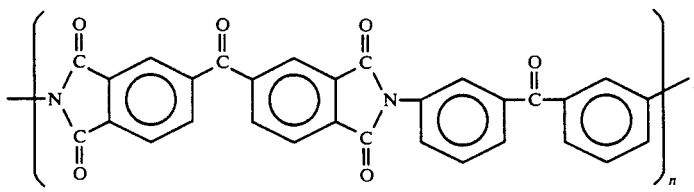

LARC-TPI

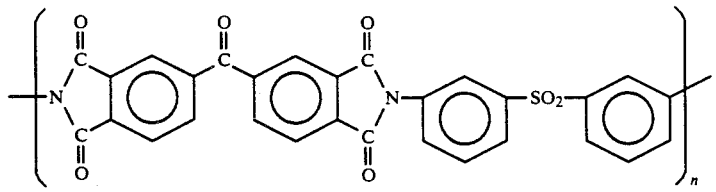

PISO2

The preparation of LARC-TPI is set forth in the following Equation (2):

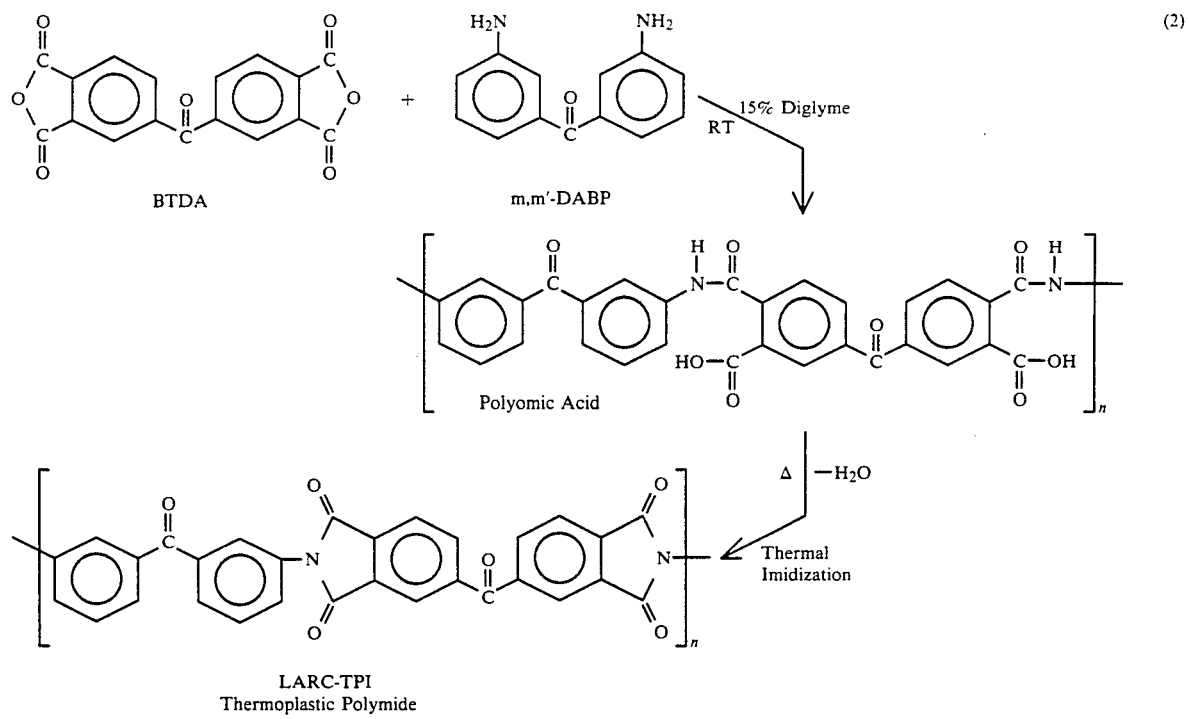

LARC-TPI
Thermoplastic Polymide

Figure 1:
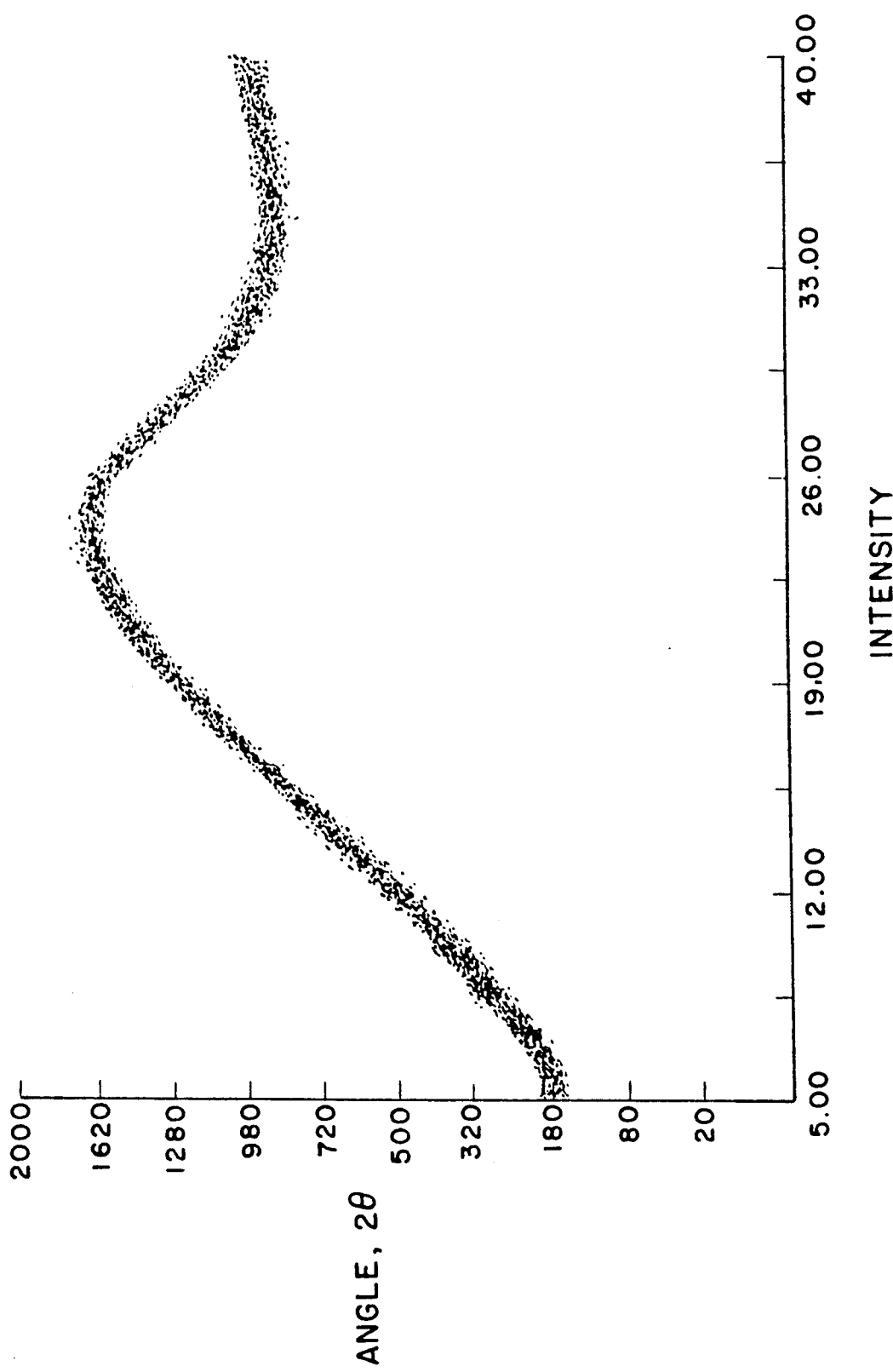
FIG. 1 is a representation of the x-ray diffraction pattern for the amorphous form of a linear aromatic polyimide designated as LARC-TPI.
Figure 2:
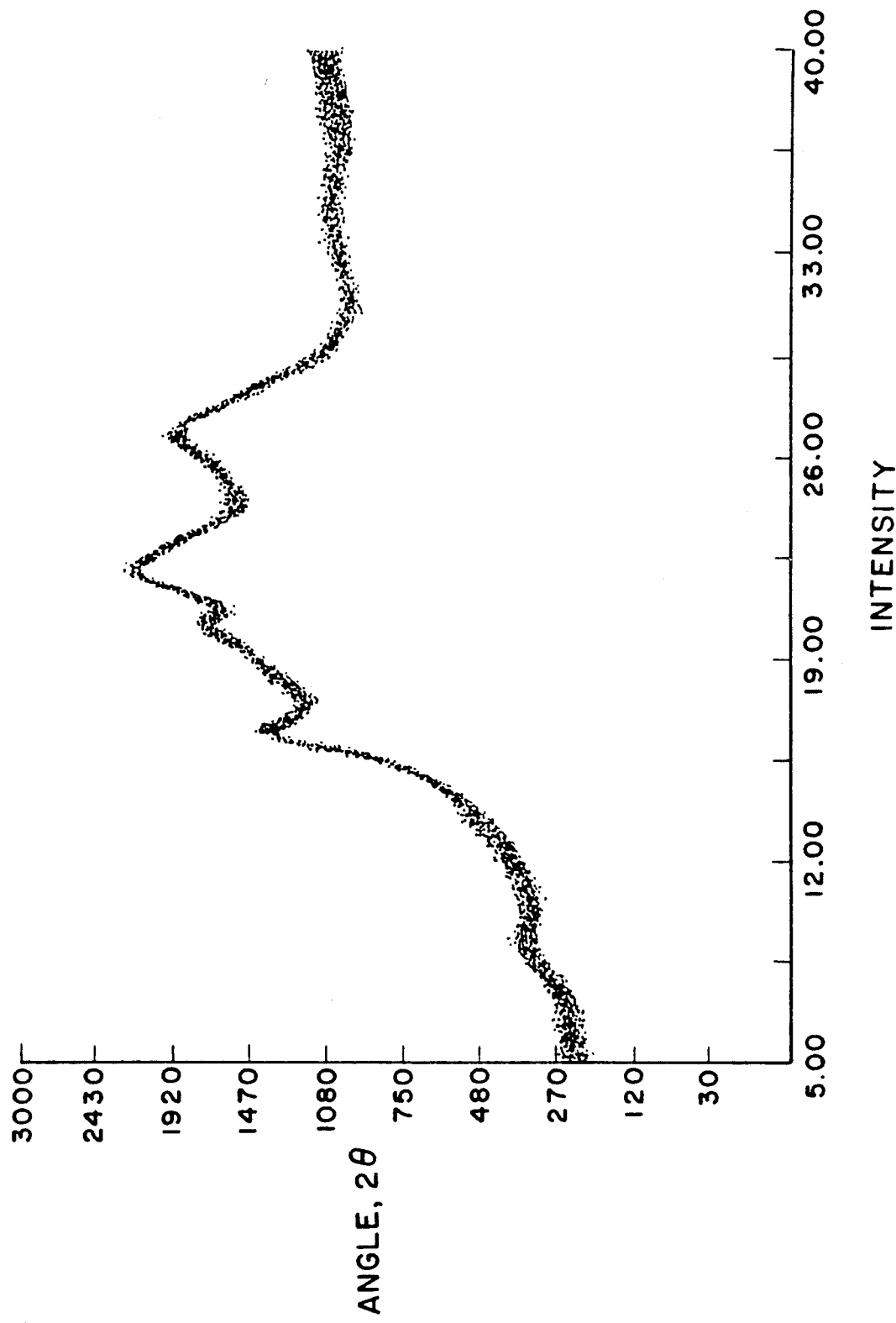
FIG. 2 is a representation of the x-ray diffraction pattern for a commercially-available semi-crystalline form of the linear aromatic polyimide LARC-TPI.

The employment of thermal dehydration in the formation of this polyimide results in a polyimide with no apparent crystallinity. An x-ray diffraction pattern for this amorphous form of LARC-TPI is shown in FIG. 1. For comparison, an x-ray diffraction pattern for a semi-crystalline LARC-TPI molding powder that was manufactured by Mitsui Toatsu Fine Chemical Company (MTC) in Japan is shown in FIG. 2. This pattern is illustrative of diffractions caused by crystallinity. The level of crystallinity has been estimated by MTC to be about 40 percent. The process by which MTC develops crystallinity in the LARC-TPI has not been disclosed. The semi-crystalline polyimide, LARC-TPI, from MTC has a melting point of about 273° C., as determined by Differential Scanning Calorimetry (DSC). However, the glass transition temperature (Tg) of the resulting amorphous polyimide (after exposing the semi-crystalline polymer to a temperature of approximately 330° C., cooling to ambient temperature, and rescanning) is lower than the reported Tg by about 40° C. (214° C. vs 254° C.). This low Tg is indicative of low molecular weight. In fact, when a sample of the MTC powder was dissolved in meta-cresol and an inherent viscosity (IV) was determined at 25° C. at 0.5% solids using a capillary viscometer (Ostwald-Fenske type), the IV was only 0.2 dL/g, as compared to a known high molecular weight LARC-TPI which has an IV of 0.4 dL/g. The viscosity of a polymer has been shown to be directly related to the molecular weight empirically by the equation $[\eta] = K'M^a$ where $[\eta]$ is the intrinsic viscosity (obtained by measuring the IV at several concentrations and extrapolating to 0% concentration of solids). The IV is a good approximation of $[\eta]$ for polyimides; K' and a are constants determined from a double logarithmic plot of intrinsic viscosity and molecular weight. The exponent, a, varies from 0.5 to 1.0, but for polyimides it is generally between 0.6 and 0.8. Typical values of K' range between 0.5 and $5 \times 10^{-4}$.

Both K' and a are functions of the solvent. In the case of LARC-TPI in meta-cresol, since the solvent remains the same and the constants K' and a are fixed for a single polymer system, then the IV is an excellent approximation of molecular weight.

The explanation for the low IV for the MTC LARC-TPI is that as a polyamide-acid is cyclodehydrated to obtain the polyimide, there is a side reaction that can occur. This side reaction involves the cyclization to the anhydride with the reformation of the amine unit as shown in the following Equation (3):

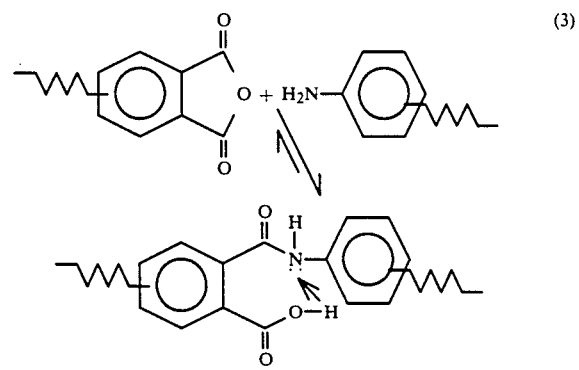

The tendency for depolymerization is influenced by the acidity of the proton, the basicity of the amide, and the nature of the solvating medium.

Chemical dehydration of polyamide-acids to form polyimides has been in use for over two decades, and is mentioned in U.S. Pat. Nos. 3,179,634 and 3,179,614. However, the employment of this technique has always involved the use of a mixture of an organic base with a dehydrating agent such as acetic anhydride. The function of the organic base was always reported to be for complexing with the acetic acid that is formed as a by-product. However, in the practice of the present invention there is evidence of an intermediate mixed anhydride as set forth in Equation (4):

tion of organic base followed by acetic anhydride is employed, there is no evidence of depolymerization as

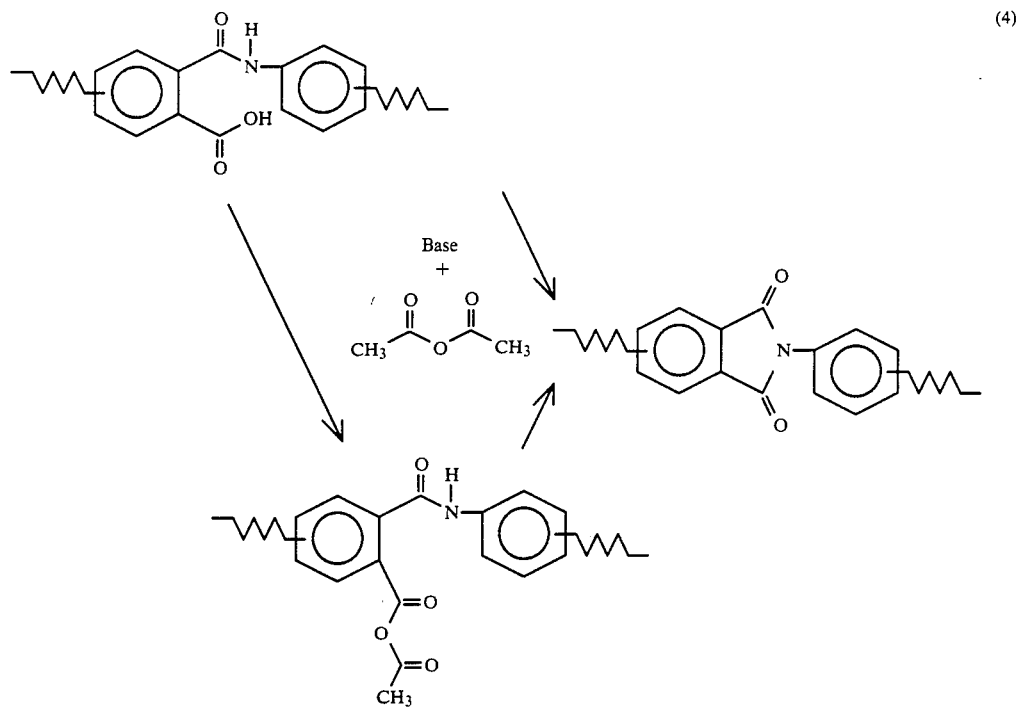

(4)

The formation of this intermediate can be enhanced if the organic base is added first to the polyamide-acid, as is done in the present invention. In this case the organic base can abstract a proton from the carboxylic acid moiety to form an anion as shown in the reaction scheme on the left in Equation (5):

is the case where the mixture of base and anhydride is employed in one step. When polyimides are cyclized using either thermal or state-of-the-art chemical techniques, there is evidence of depolymerization from infrared spectroscopy, which shows a significant level of reformed aromatic anhydride (Young and Chang, 30th

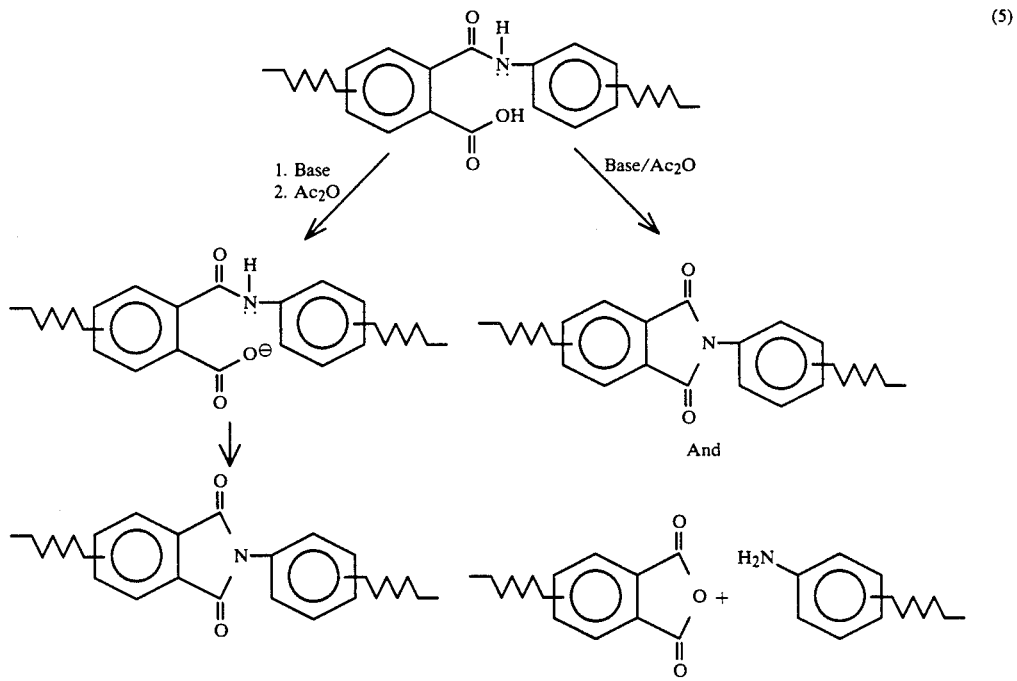

(5)

This anion can either add an acetylene group from acetic anhydride with subsequent elimination of acetic acid as shown in Equation (4) above or simply cyclize to the imide structure directly. When this sequential addi- National SAMPE Symposium, Vol. 30, pp. 889–902, 1985). Therefore, an obvious benefit of this invention is the absence of this retrograde reaction as depicted in Equation (6):

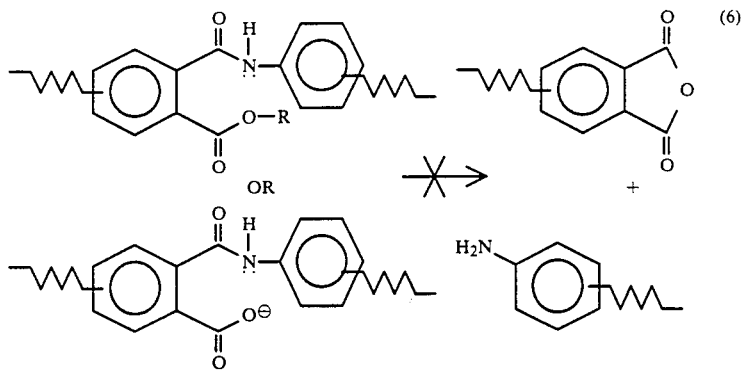

Where R = Acetyl.

Figure 3:
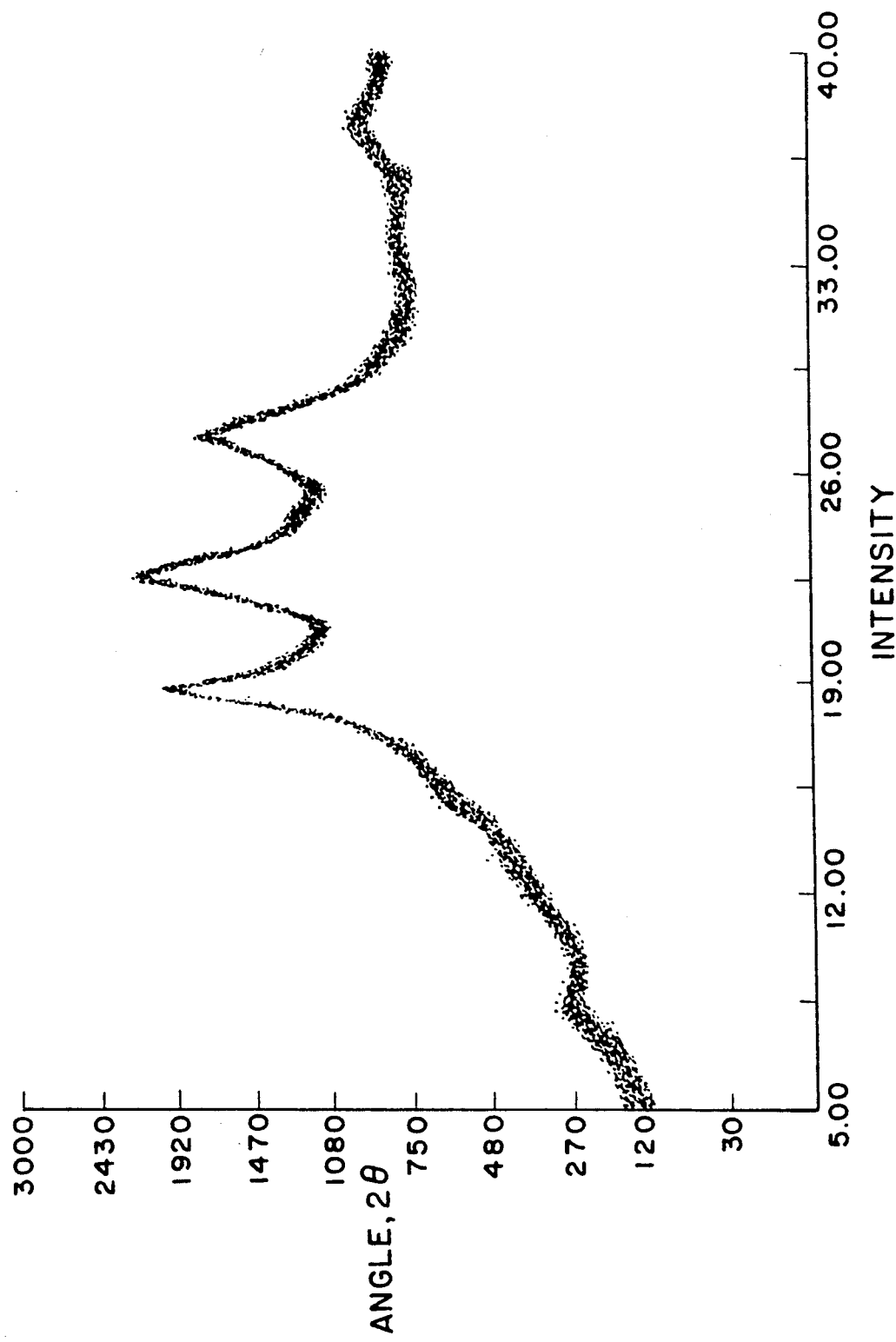
FIG. 3 is a representation of the x-ray diffraction pattern for the linear aromatic polyimide LARC-TPI as prepared according to a first embodiment of the present invention.

After diluting a 30 percent solution of LARC-TPI polyamide-acid in diglyme with N-methylpyrrolidone to yield a ten percent solution, this sequential addition of organic base followed by the acetic anhydride not only allowed for near quantitative conversion of the polyamide-acid to the polyimide, but it also allowed for the formation of a significant level of crystallinity in the resulting polyimide. FIG. 3 is the x-ray diffraction pattern of LARC-TPI which was prepared using this novel technique with triethylamine as the base. The highly refined pattern indicates a level of crystallinity higher than for the MTC LARC-TPI (FIG. 2).

Figure 4:
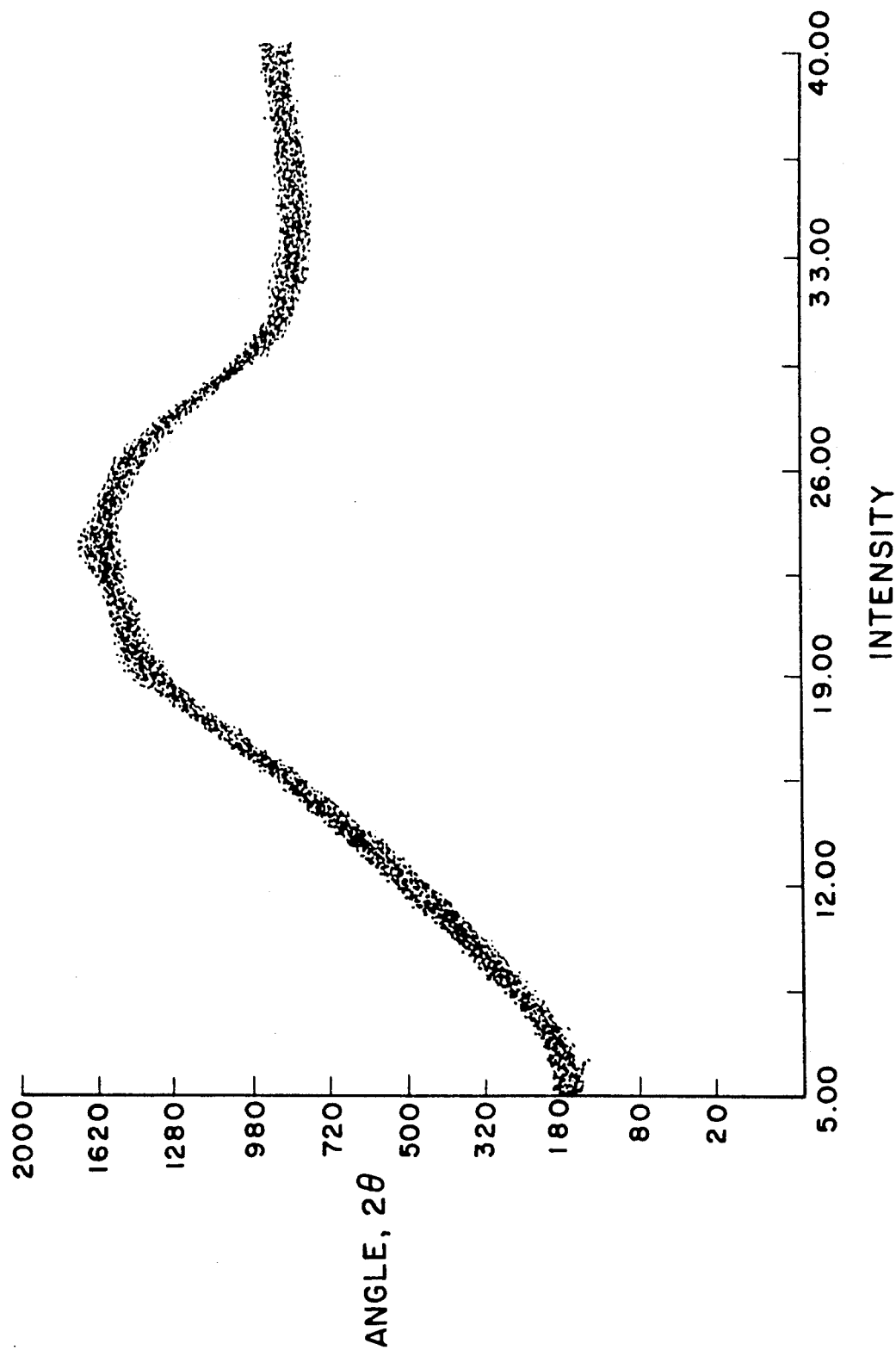
FIG. 4 is a representation of the x-ray diffraction pattern for the linear aromatic polyimide LARC-TPI as prepared by a first process which is similar to, but not the same as, the present invention.

For comparison, the same LARC-TPI polyamide-acid solution was treated with the same two reagents in the reverse order; that is, first the acetic anhydride was added and stirred for five minutes, and next the organic base, triethylamine, was added and stirring continued for one hour. The x-ray diffraction pattern for this polymer is shown in FIG. 4. This polymer exhibits a relatively small amount of crystallinity when compared to the polymer in FIG. 3.

Figure 5:
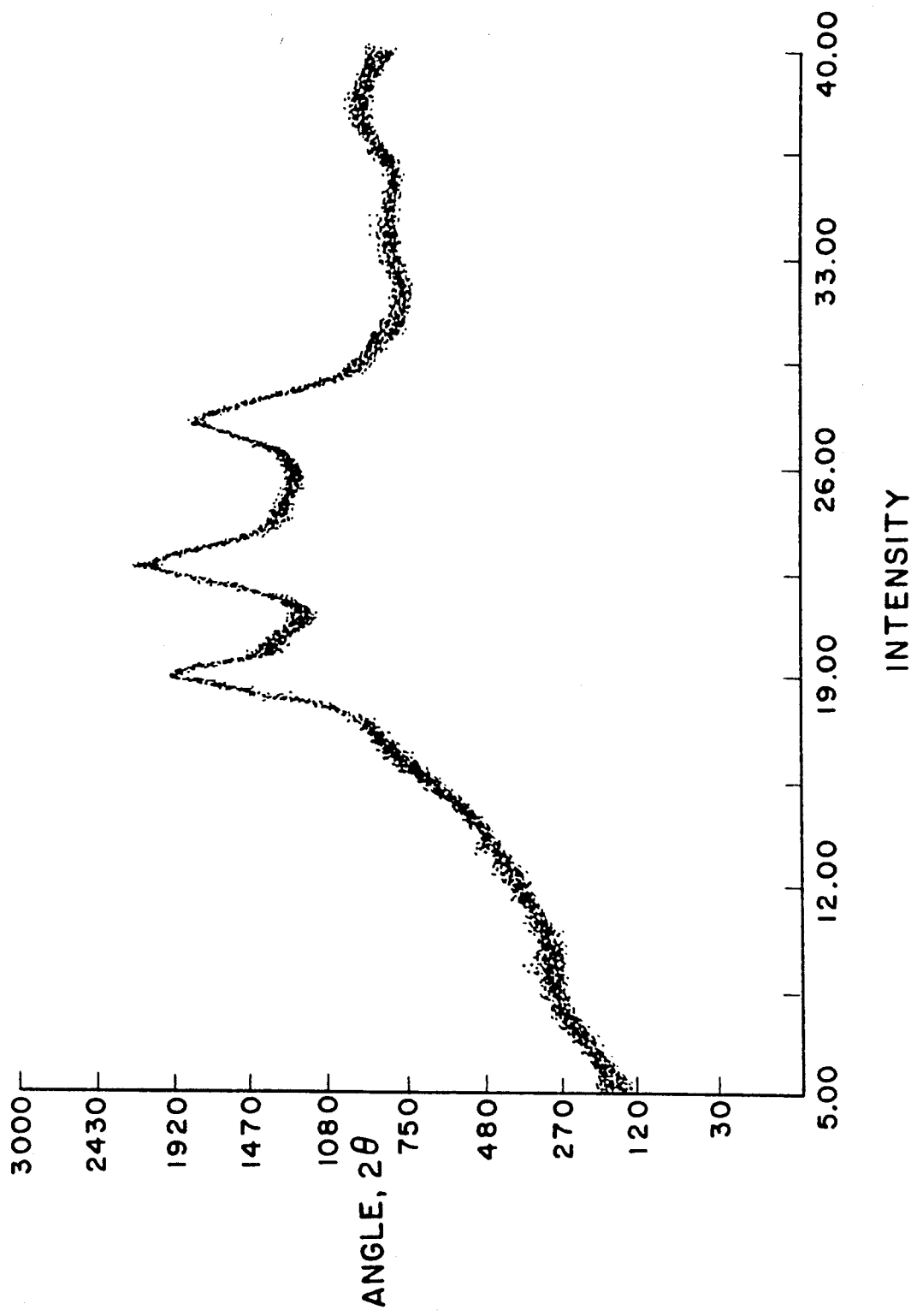
FIG. 5 is a representation of the x-ray diffraction pattern for LARC-TPI which is prepared according to a second embodiment of the present invention.

In order to determine if other aprotic organic bases would work, pyridine was substituted for triethylamine, and the same procedure was followed as for the polymer that yielded the x-ray diffraction pattern shown in FIG. 3. The x-ray diffraction pattern for the polyimide from this pyridine-followed-by-acetic-anhydride process is shown in FIG. 5. It is evident that this material is nearly identical in crystalline structure and content to the polyimide that afforded the x-ray diffraction pattern shown in FIG. 3.

Figure 6:
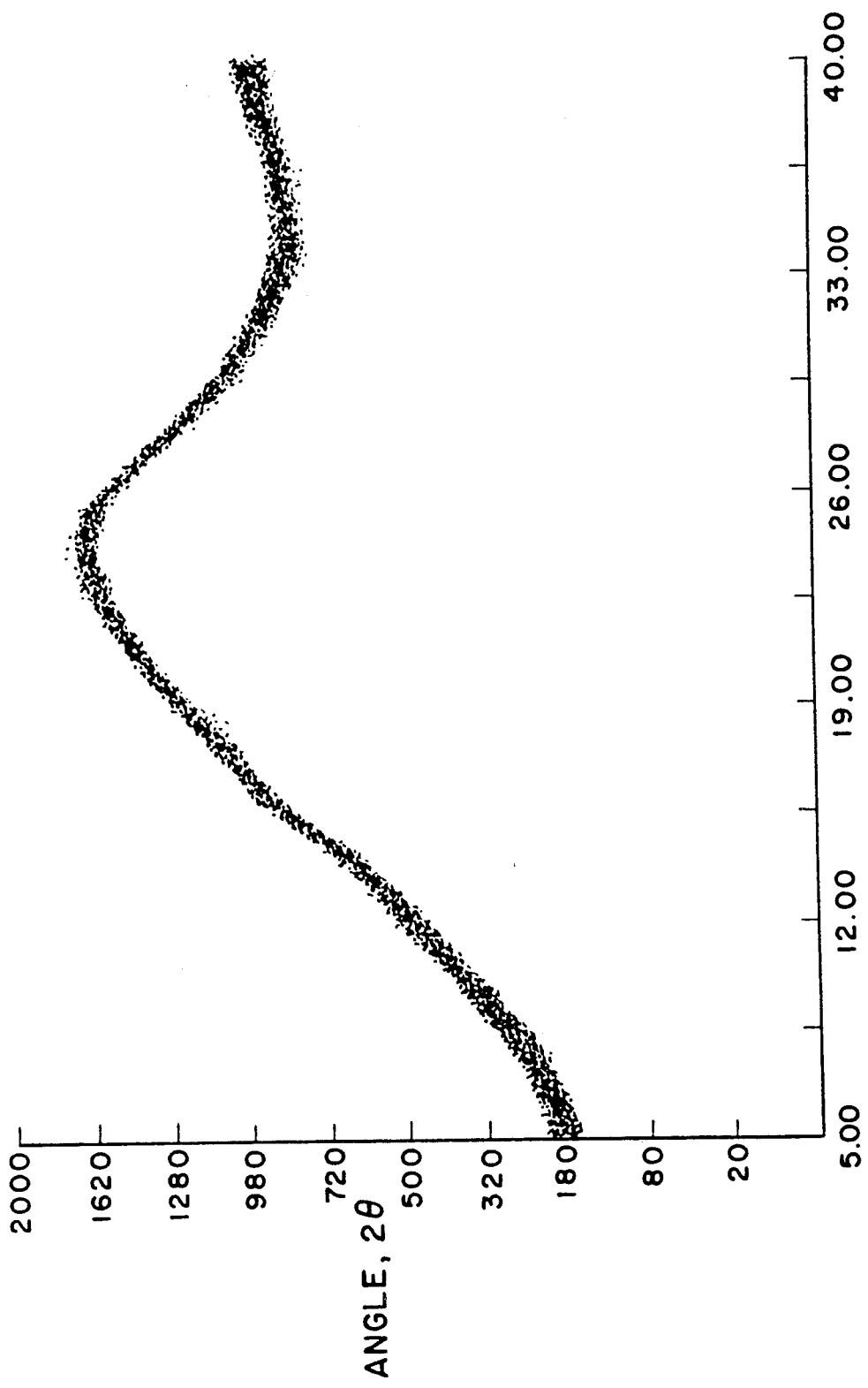
FIG. 6 is a representation of the x-ray diffraction pattern for LARC-TPI which is prepared by a second process which is similar to, but not the same as, the present invention.

FIG. 6 shows the x-ray diffraction pattern of the same polymer, LARC-TPI, when the polyamide-acid solution was diluted with more diglyme instead of N-methylpyrrolidone to yield a ten percent solution. Without the presence of the amide solvent there was practically no crystallinity evident.

In addition, the chemically imidized LARC-TPI which afforded the crystalline x-ray diffraction shown in FIG. 3 was redissolved in meta-cresol, and an inherent viscosity was determined to be 0.4 dL/g. This indicates high molecular weight (as compared to the MTC LARC-TPI which had an inherent viscosity of 0.2 dL/g).

Figure 8:
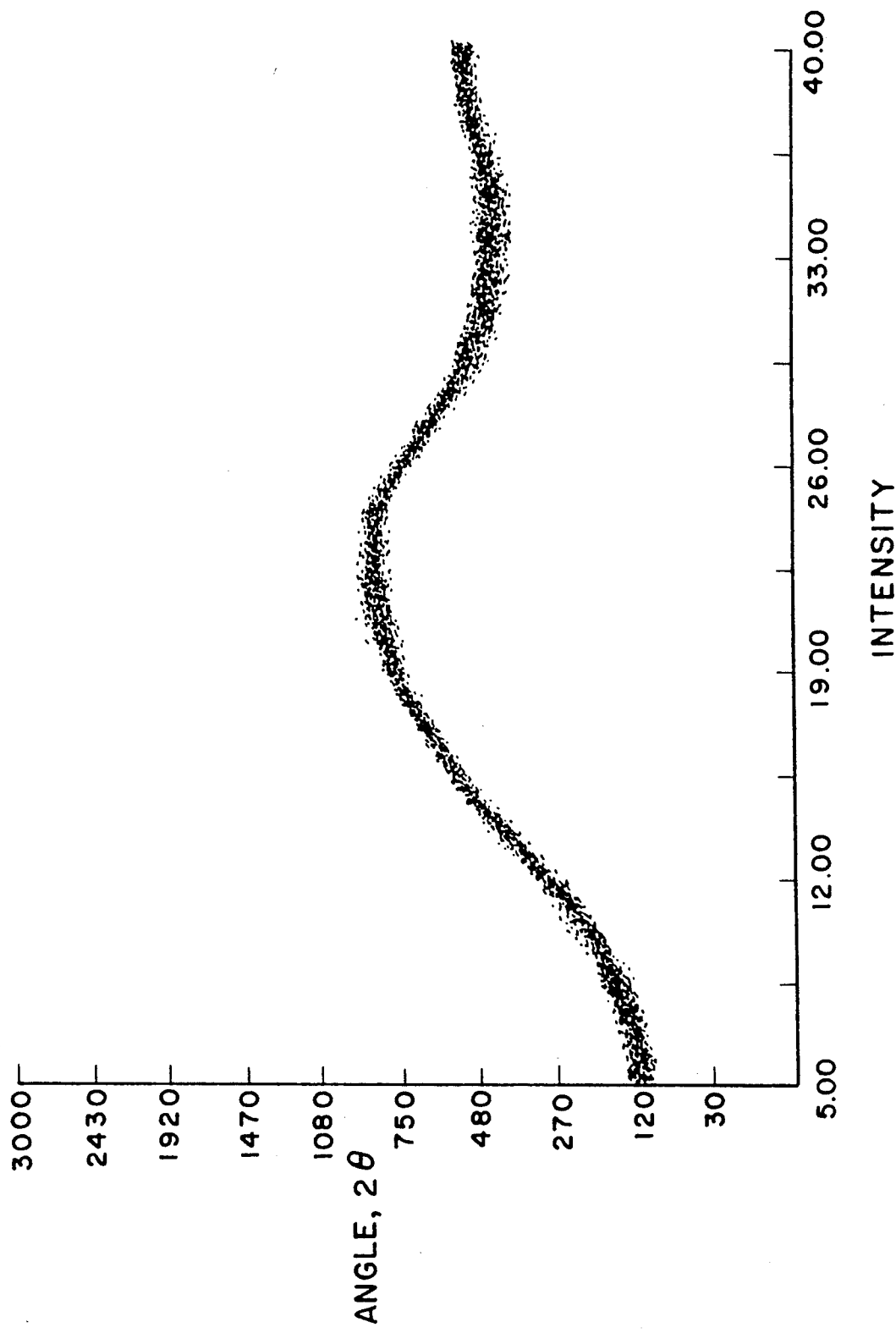
FIG. 8 is a representation of the x-ray diffraction pattern for PISO2 which was imidized by heating.
Figure 7:
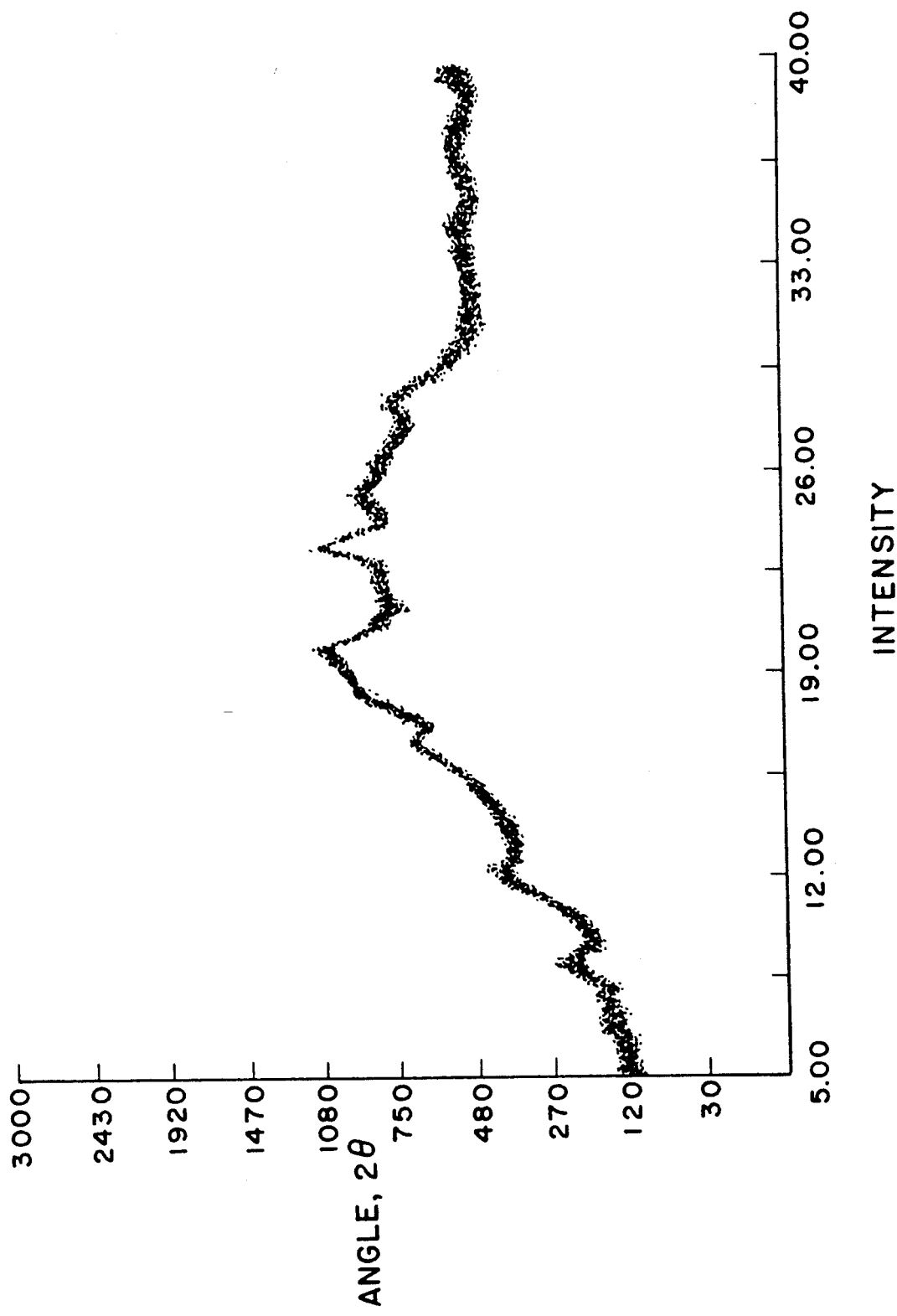
FIG. 7 is a representation of the x-ray diffraction pattern for the linear aromatic polyimide polyimidesulfone (PISO2) as prepared according to another embodiment of the present invention.

Another polyamide-acid in diglyme at 30 percent solids, polyimidesulfone or PISO2 as structurally shown supra, was diluted with N-methylpyrrolidone to yield a ten percent solids solution. This solution was stirred with an equal volume of triethylamine for 30 minutes. Next a volume of acetic anhydride equal to the triethylamine was added, and stirring continued for 48 hours. After the powdered polyimide was collected and dried, it was found to be crystalline by x-ray diffraction (FIG. 7). A sample of PISO2 that was imidized by heating the polyamide-acid powder to 300° C. was found to be totally amorphous as shown in FIG. 8.

A commonly used polyimide of the following structure

Figure 9:
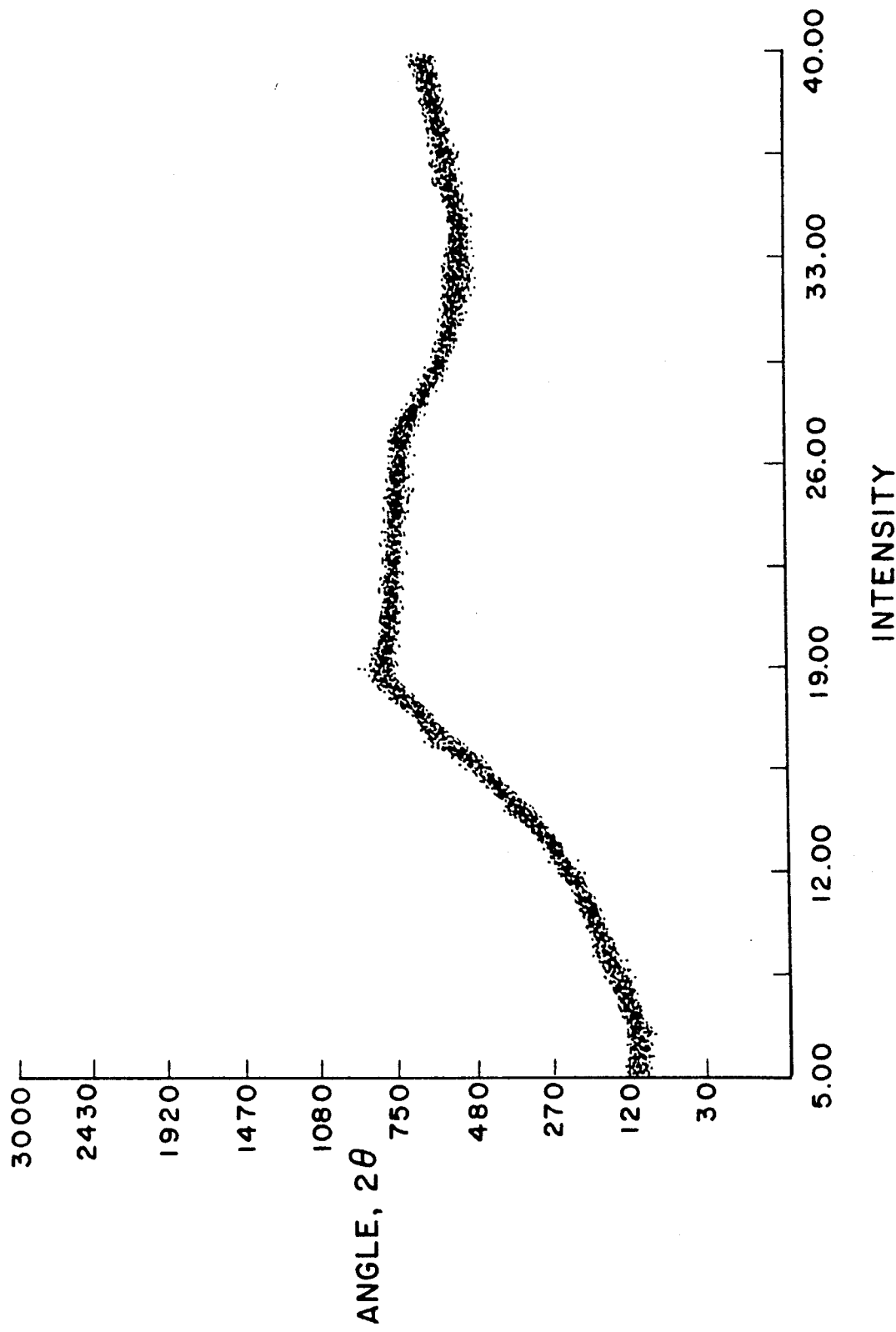
FIG. 9 is a representation of the x-ray diffraction pattern for the linear aromatic polyimide BTDA-ODA as prepared according to another embodiment of the present invention.

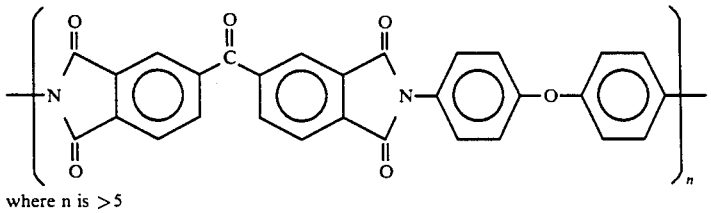

where n is >5 and designated BTDA-ODA was chemically imidized in the same manner as was the PISO2 in the foregoing discussion. No reports of significant amounts of crystallinity have been previously issued for this polymer. However, the polyimide of BTDA-ODA made by this invention exhibited a significant level of crystallinity as evidenced by the x-ray diffraction seen in FIG. 9.

Figure 10:
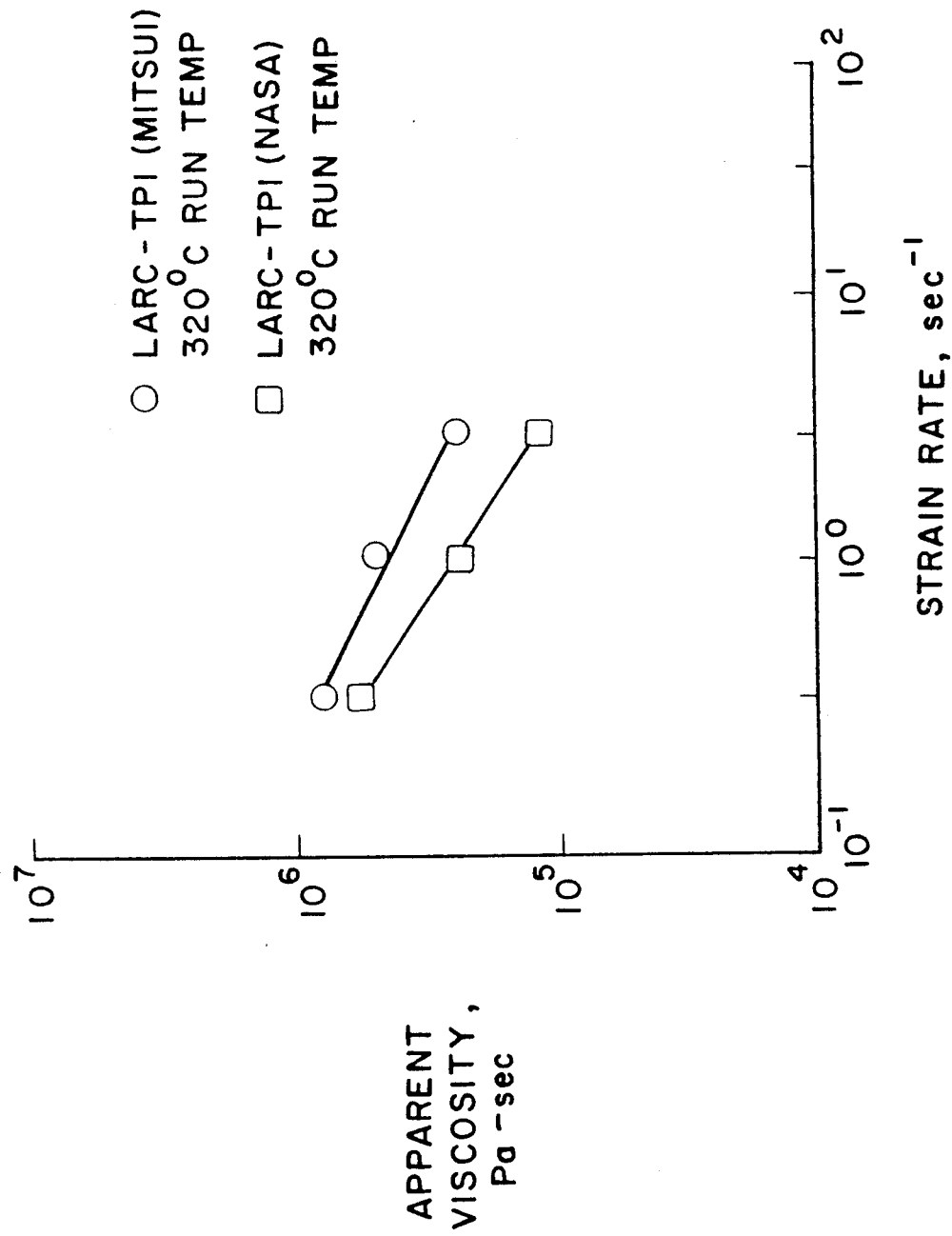
FIG. 10 is a plot of apparent viscosity as a function of strain rate for LARC-TPI which is prepared according to the present invention and for semicrystalline LARC-TPI which is available commercially.

The melt flow behavior of the crystalline MTC LARC-TPI was compared to that of the NASA LARC-TPI that afforded the x-ray diffraction in FIG. 3 (viz., that which was made according to the present invention). The apparent viscosity as a function of strain rate is plotted in FIG. 10. Even though the NASA LARC-TPI had a higher inherent viscosity than did the MTC LARC-TPI (0.4 vs. 0.2 dL/g), the NASA LARC-TPI exhibited slightly lower viscosities than did the MTC LARC-TPI. This difference is likely attributable to a higher level of crystallinity in the NASA LARC-TPI since the molecular weight MTC polymer should have exhibited lower viscosity if all other factors were equivalent.

The following specific examples are presented to further illustrate, but not to limit the present invention, and to reveal the best mode known to the inventor for putting the present invention into practice.

EXAMPLE I

The polyamide-acid of LARC-TPI at 29.1% solids in diglyme (bis-2-methoxyethylether) was obtained from Mitsui Toatsu Corporation (MTC), Tokyo, Japan. This LARC-TPI (50 ml) was diluted with 100 ml of diglyme. Next was added a solution composed of 300 ml of acetic anhydride and 300 ml of triethylamine (TEA) which had been previously mixed in a separate flask. This solution was stirred overnight, and the solid that precipitated was collected by suction filtration and was washed with 500 ml of water. Next this powder was dried in air for 30 minutes and then placed in an air oven at 100° C. for two hours. This powder was analyzed by x-ray diffraction and DSC. No crystallinity was evident.

EXAMPLE II

The same polyamide-acid as in Example I was diluted with N-methylpyrrolidone (NMP). That is, 50 ml of the MTC polyamide-acid was diluted with 100 ml of NMP. The same procedure as in Example I was followed. Only a trace of crystallinity was evident in the x-ray diffraction pattern.

EXAMPLE III

Another sample of the MTC polyamide-acid that had been diluted with NMP as in Example II was stirred and 300 ml of TEA was added and the mixture continued to stir for ten minutes. Next 300 ml of acetic anhydride was added and stirring continued for one hour. The workup of this solid polyimide was the same as in Example I. In this Example the DSC indicated a melt endotherm that had a minimum at about 270° C. The x-ray diffraction exhibited a pattern typical of a crystalline structure (FIG. 3). The estimate of crystallinity from the x-ray diffraction was about 50% or higher. The inherent viscosity of this polyimide was found to be 0.4 dL/g when run at 0.5% solids in meta-cresol at 25° C. using an Ostwald-Fenske viscometer.

EXAMPLE IV

Another 200 ml sample of the MTC polyamide-acid was diluted with 400 ml of NMP. To this was added 200 ml of TEA. This mixture was stirred in a blender for 20 minutes. Next 200 ml of acetic anhydride was added, and the mixture was stirred for 24 hours. The solid was collected and dried as in Example I. The resulting polyimide had a large endotherm with a minimum near 250° C. The x-ray diffraction pattern indicated the sample to be crystalline (similar to FIG. 3). The fine particles from this reaction mixture were analyzed by x-ray diffraction and found to have a higher degree of crystallinity than the coarser particles.

EXAMPLE V

A 50 ml sample of the polyimidesulfone (PISO2) in diglyme at 29% solids was precipitated from solution by the addition of 200 ml of water. The powder was collected by suction filtration. This polyamide-acid power was dried for one hour at 100° C., one hour at 200° C. and then one hour at 300° C. This resulting polyimide powder was found to exhibit no sign of crystallinity by either x-ray diffraction or DSC.

EXAMPLE VI

A 50 ml sample of PISO2 in diglyme at 29% solids was diluted with 100 ml of NMP. To this was added 150 ml of TEA and the mixture was stirred for 30 minutes. Next 150 ml of acetic anhydride was added, and the mixture was stirred for 48 hours. Water (200 ml) was added to precipitate the polyimide, because the imide form of PISO2 is soluble in NMP. The solid polymer was collected by suction filtration and was air dried for seven days at ambient conditions. The polymer was then placed in an oven and heated to 100° C. and held at that temperature for five hours, because a large amount of acetic acid evolution occurred. Next the powder was heated to 200° C. and held for three hours to ensure total elimination of acetic acid. The powder was analyzed by DSC and found to have a melt endotherm at about 230° C. The x-ray diffraction pattern (FIG. 7) showed the polyimide to have a significant level of crystallinity.

EXAMPLE VII

A 10 ml sample of the polyamide-acid designated BTDA-ODA that had been prepared in N,N-dimethylacetamide at 15% solids was diluted with 20 ml of NMP. To this mixture was added 10 ml of TEA, and stirring was effected for 30 minutes. Next 10 ml of acetic anhydride was added, and the mixture was stirred overnight. This polyimide precipitated in large chunks, which were collected by suction filtration. They were air dried overnight and heated in an air oven for one hour at 100° C. This material was ground to a powder, after which the x-ray diffraction pattern thereof (FIG. 9) was determined. A significant level of crystallinity was indicated.

EXAMPLE VIII

A 50 ml sample of the MTC LARC-TPI polyamide-acid as in Example II was diluted to ten percent solids with NMP. To this was added 150 ml of pyridine, and the reaction mixture was stirred for 30 minutes. Next was added 150 ml of acetic anhydride, and the mixture was stirred for one hour and allowed to stand without stirring for 48 hours. The solid was collected by suction filtration and was washed with 500 ml of water. The solid was air dried for one hour and then heated to 100° C. in an air oven for one hour. The x-ray diffraction pattern showed the polyimide to be crystalline (FIG. 5).

According to the present invention, particular polyamide-acids are chemically dehydrated to form polyimides which are semi-crystalline and which have melting temperatures near the glass transition temperatures of the amorphous forms of the polyimides. Upon melting of these semi-crystalline polyimides, the crystalline forms do not reform. Flow is thereby enhanced as melting occurs. Moreover, the semi-crystalline polyimides are prepared without degradation of the molecular weight of the polyimides.

The present invention has been described in detail with respect to certain preferred embodiments thereof. As is understood by those of skill in the art, variations and modifications in this detail may be effected without any departure from the spirit and scope of the present invention, as defined in the hereotoappended claims.

What is claimed is:

1. A process for maximizing the level of crystallinity in a linear aromatic polyimide, which process consists essentially of the following sequential steps:
   dissolving a polyamide-acid in an amide-containing solvent system to produce a solution having a concentration of about 10% solids by weight, the polyamide-acid being the reaction product of 3,3',4,4'-benzophenonetetracarboxylic dianhydride and an aromatic diamine;
   admixing two volumes of an aprotic organic base with one volume of the solution of polyamide-acid;
   admixing a volume equal to the volume of aprotic organic base of an organic dehydrating agent with the polyamide-acid solution/aprotic organic base admixture, followed by stirring for at least one hour;
   recovering the resulting solid by standard techniques; and thermally treating the recovered solid at a temperature of 100° C. or greater for at least 30 minutes.

2. The process of claim 1, wherein the polyamide-acid is the reaction product of 3,3',4,4'-benzophenonetetracarboxylic dianhydride and 3,3'-diaminobenzophenone prepared in diglyme.

3. The process of claim 1, wherein the polyamide-acid is the reaction product of 3,3',4,4'-benzophenonetetracarboxylic dianhydride and 4,4'-oxydianiline prepared in dimethylacetamide.

4. The process of claim 1, wherein the polyamide-acid is the reaction product of 3,3',4,4'-benzophenonetetracarboxylic dianhydride and 3,3'-diaminodiphenylsulfone prepared in diglyme.

5. The process of claim 1, wherein the amide-containing solvent system comprises N-methylpyrrolidone.

6. The process of claim 5, wherein the amide-containing solvent system comprises an ether in addition to N-methylpyrrolidone.

7. The process of claim 1, wherein the aprotic organic base is selected from the group consisting of triethylamine and pyridine.

8. The process of claim 1, wherein the organic dehydrating agent is acetic anhydride.

* * * * *